US012579490B2

(12) United States Patent
Meeks

(10) Patent No.: US 12,579,490 B2
(45) Date of Patent: Mar. 17, 2026

(54) GENERATING SUGGESTIONS WITHIN A DATA INTEGRATION SYSTEM

(71) Applicant: Dropbox, Inc., San Francisco, CA (US)

(72) Inventor: Christopher Meeks, Austin, TX (US)

(73) Assignee: Dropbox, Inc., San Francisco, CA (US)

( * ) Notice: Subject to any disclaimer, the term of this patent is extended or adjusted under 35 U.S.C. 154(b) by 354 days.

(21) Appl. No.: 18/059,877

(22) Filed: Nov. 29, 2022

(65) Prior Publication Data

US 2024/0177087 A1     May 30, 2024

(51) Int. Cl.
*G06Q 10/0631* (2023.01)
(52) U.S. Cl.
CPC .............................. *G06Q 10/06313* (2013.01)
(58) Field of Classification Search
None
See application file for complete search history.

(56) References Cited

U.S. PATENT DOCUMENTS

| | | | |
|---|---|---|---|
| 7,949,578 B2 | 5/2011 | Johnson et al. | |
| 8,767,948 B1 * | 7/2014 | Riahi .................. | H04M 3/5175 |
| | | | 379/266.01 |
| 10,320,633 B1 * | 6/2019 | Wong .................... | H04L 67/535 |
| 10,706,453 B1 | 7/2020 | Morin et al. | |
| 2005/0054381 A1 | 3/2005 | Lee et al. | |
| 2012/0290446 A1 * | 11/2012 | England ................. | G06Q 50/01 |
| | | | 705/27.1 |

| | | | |
|---|---|---|---|
| 2014/0136381 A1 * | 5/2014 | Joseph ................... | G06Q 40/02 |
| | | | 705/35 |
| 2017/0330219 A1 * | 11/2017 | Feldman ............ | G06Q 30/0243 |
| 2017/0357480 A1 * | 12/2017 | La Placa ............... | G06F 16/252 |

(Continued)

FOREIGN PATENT DOCUMENTS

KR            102147450 B1 *   8/2020   ..... G06Q 10/063112

OTHER PUBLICATIONS

Santy, B. S. Nugroho, V. August and G. Maharlian, "Feasibility Study and Prototype Design of Freelancer Online Marketplace," 2020 International Conference on Information Management and Technology (ICIMTech), Bandung, Indonesia (Year: 2020).*

(Continued)

*Primary Examiner* — Jerry O'Connor
*Assistant Examiner* — Philip N Warner
(74) *Attorney, Agent, or Firm* — Keller Preece PLLC

(57) ABSTRACT

The present disclosure is directed toward systems, methods, and non-transitory computer readable media for consolidating freelancer information of a plurality of freelancer data categories in a centralized environment for performing various tasks in relation to freelancer development. For example, the disclosed systems can determine interaction parameters based on user interactions associated with a freelancer account and determine freelancer information associated with a plurality of freelancer data categories. In certain cases, the disclosed systems can analyze the interaction parameters and freelancer information to generate a suggested action associated with a first freelancer data category from the plurality of freelancer data categories. The disclosed systems can also provide for display a freelancer account summary interface comprising a notification of the suggested action with a predicted result associated with the first freelancer data category.

20 Claims, 12 Drawing Sheets

(56) References Cited

U.S. PATENT DOCUMENTS

| | | | |
|---|---|---|---|
| 2018/0012188 A1* | 1/2018 | Kramer | G06Q 10/06398 |
| 2018/0365628 A1* | 12/2018 | Bhaskaran | G06Q 10/063112 |
| 2019/0325532 A1* | 10/2019 | Torrenegra | G06Q 10/1053 |
| 2020/0242670 A1* | 7/2020 | Thye | H04L 47/822 |
| 2020/0302564 A1* | 9/2020 | Varga | G06F 16/24578 |
| 2020/0394721 A1* | 12/2020 | Gonzalez | G06Q 50/26 |
| 2021/0089725 A1* | 3/2021 | Andreev | G06F 40/58 |
| 2021/0150623 A1* | 5/2021 | Rostami | G06Q 20/3676 |
| 2021/0358032 A1* | 11/2021 | Cella | G06F 18/241 |
| 2022/0026862 A1* | 1/2022 | Guha | G05B 13/0265 |
| 2022/0044277 A1* | 2/2022 | Geiger | G06Q 30/0201 |
| 2022/0342911 A1* | 10/2022 | Dhir | G06F 16/2386 |
| 2022/0366459 A1* | 11/2022 | Vieyra | H04L 65/4038 |

OTHER PUBLICATIONS

Liu J., et al., "An Adaptive User Interface Based on Personalized Learning," IEEE Intelligent Systems, vol. 18, No. 2, Mar.-Apr. 2003, pp. 52-57.

* cited by examiner

1000

Determining Interaction Parameters For A Freelancer Account    1010

Determining Freelancer Information For A Plurality Of Freelancer Data Categories    1020

Analyzing Interaction Parameters And Freelancer Information To Generate A Suggested Action    1030

Displaying A Freelancer Account Summary Interface With The Suggested Action And A Predicted Result    1040

1200

GENERATING SUGGESTIONS WITHIN A DATA INTEGRATION SYSTEM

BACKGROUND

Advancements in computing devices and networking technology have given rise to a variety of innovations in data management and manipulation. For example, data integration systems can provide access to a variety of computer applications to consolidate management of diverse data for performing various tasks. Indeed, modern data integration systems can provide access to applications, data, and a variety of other digital resources for users to collaborate across diverse physical locations and over a variety of computing devices. Despite these advances, however, existing data integration systems continue to suffer from a number of disadvantages, particularly in terms of flexibility, efficiency, and accuracy.

As just suggested, many existing data integration systems are inflexible. More specifically, many existing data integrations systems are limited to data categories supported directly by the system, thus limiting the scope of resources available to the user. As further suggested, many existing data integration systems are inefficient. For instance, many existing data integrations systems require a user to redirect to additional applications and interfaces to access data and resources not supported or otherwise available via a centralized interface. Due at least in part to their inefficiency, existing data integration systems are sometimes inaccurate. In particular, many existing systems are tied to user-implemented updates of data from third-party applications, leading to presentation of out-of-date information.

Thus, there are several disadvantages with regard to existing data integration systems.

SUMMARY

This disclosure describes one or more embodiments of systems, methods, and non-transitory computer-readable storage media that provide benefits and/or solve one or more of the foregoing and other problems in the art. For instance, the disclosed systems provide a new software platform for generating, arranging, receiving, and providing consolidated data integration and management across a variety of data categories related to business development for freelancers and small businesses. For example, the disclosed systems provide a centralized environment for a variety of freelancer data categories such as but not limited to finances, taxes, insurances, licensing, legal documentation, client information, leads, project and team management, and so forth. Moreover, the disclosed systems provide streamlined user interfaces to present consolidated freelancer data in an intuitive arrangement that promotes productive and efficient manipulation, combination, and analysis of freelancer data. The disclosed systems can also provide suggested actions for freelancer development based on analysis of freelancer interactions across various data categories of consolidated freelancer data.

BRIEF DESCRIPTION OF THE DRAWINGS

This disclosure will describe one or more example implementations of the systems and methods with additional specificity and detail by referencing the accompanying figures. The following paragraphs briefly describe those figures, in which.

DETAILED DESCRIPTION

Figure 1:
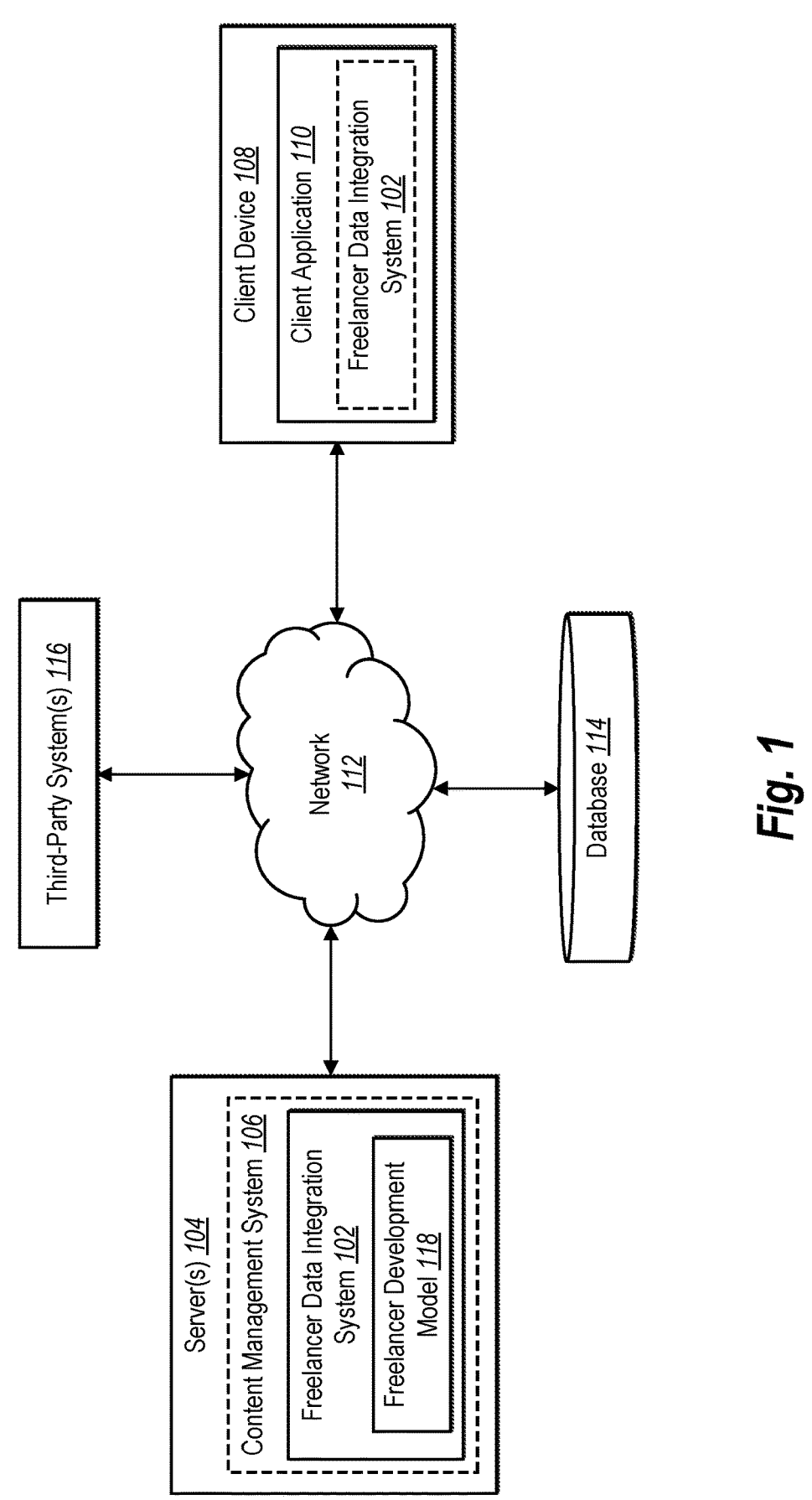
FIG. 1 illustrates a schematic diagram of an example environment of a freelancer data integration system in accordance with one or more embodiments.

This disclosure describes one or more embodiments of a freelancer data integration system that consolidates various categories of data in a centralized environment for performing a variety of tasks related to freelancer or small business development. In particular, the freelancer data integration system can consolidate freelancer information for a number of freelancer data categories in a centralized user interface. For example, the freelancer data integration system can provide a freelancer account interface for direct interaction with a plurality of freelancer data categories for business development and resource management. Further, the freelancer data integration system can generate reactive and/or predictive suggestions for freelancer development based on freelancer information and user interactions with a freelancer account. In addition, the freelancer data integration system can utilize intelligent models for forecasting freelancer development, analyzing freelancer information and user interactions, generating development suggestions, and predicting development results associated with such suggestions.

As just mentioned, the freelancer data integration system can generate suggested actions for freelancer development based on freelancer information from various freelancer data categories and user interaction with a freelancer account. More particularly, in one or more embodiments, the freelancer data integration system determines interaction parameters based on user interactions associated with a freelancer account over time and determines, for the freelancer account, freelancer information associated with a plurality of data categories. Further, the freelancer data integration system can analyze the interaction parameters and the freelancer information to generate a suggested action for the freelancer account, the suggested action associated with a first freelancer data category from the plurality of freelancer data categories. In addition, the freelancer data integration system can provide, for display on a client device associated with the freelancer account, a freelancer account summary interface comprising a notification of the suggested action together with visual representation of a predicted result associated with one or more freelancer data categories of the plurality of freelancer data categories.

As suggested above, the freelancer data integration system can provide several improvements or advantages over existing data integration systems. For example, some embodiments of the freelancer data integration system can improve flexibility over prior systems. As opposed to existing systems that rigidly limit data categories to those supported by the system itself, the freelancer data integration system integrates data categories across various resources and systems to consolidate freelancer information into a centralized environment. As a result, the freelancer data integration system can provide more flexible, modifiable data management tools tailored for specific use cases (such as freelancer business development).

In addition to improving flexibility over prior data integration systems, the freelancer data integration system can also improve accuracy and efficiency. To elaborate, rather than requiring users of a freelancer account to seek data from the various data sources individually, the freelancer data integration system can consolidate freelancer data across sources and, in some cases, provide predictive suggestions per analysis of the various data streams and user interactions therewith. Indeed, the freelancer data integration system can provide a centralized environment for accurate presentation of information pertinent to freelancer development over a variety of freelancer data categories to enable accurate presentation and efficient utilization of freelancer information via the freelancer data integration system. Consequently, the freelancer data integration system further saves computing resources that prior systems expend processing their larger numbers of user interactions for accessing or organizing data associated with a variety of categories.

In addition to the above advantages, the freelancer data integration system provides more efficient graphical user interfaces in comparison to prior data integration systems. For example, prior data integration systems often require a user to perform several navigation interactions to navigate between various applications and various user interfaces to locate and analyze data from various data categories. Unlike prior systems, the freelancer data integration system provides graphical user interfaces that combine data from various data categories into a single graphical user interface, which reduces the number of steps a user must perform to locate and analyze the data. Indeed, in some embodiments, the freelancer data integration system provides unique combinations of data categories and data analysis with a graphical user interface based on receiving a single user interaction. Accordingly, the freelancer data integration system provides a more efficient graphical user interface in comparison with prior systems.

As illustrated by the foregoing discussion, the present disclosure utilizes a variety of terms to describe features and benefits of the freelancer data integration system. Additional detail is hereafter provided regarding the meaning of these terms as used in this disclosure. As used herein, the term "freelancer account" refers to an account associated with a user or group of users of the freelancer data integration system. A freelancer account can include a single user account or a group of user accounts associated with a small business entity or a freelancer's business efforts. Relatedly, as used herein, the term "freelancer" refers to a person working for various companies at different times rather than being permanently employed by a larger company. However, a freelancer may further include a small business employing a relatively small number of persons in support of various companies and/or contracts for work.

Moreover, as used herein, the term "freelancer data category" refers to a category of data associated with freelancer or small business management and development. In some cases, freelancer data categories include finances, taxes, health or other insurance, legal documents, client information, business leads, and team members. Also, freelancer data categories can include any data categories associated with freelancer business development efforts. Relatedly, as used herein, the term "freelancer information" includes information and/or data associated with a freelancer account. For example, freelancer information can include data corresponding to one or more freelancer data categories within a freelancer account.

As mentioned above, the freelancer data integration system can generate suggested actions for freelancer development using one or more machine learning models. As used herein, the term "machine learning model" refers to a computer algorithm or a collection of computer algorithms that automatically improve for a particular task through iterative outputs or predictions based on use of data. For example, a machine learning model can utilize one or more learning techniques to improve in accuracy and/or effectiveness. Example machine learning models include various types of neural networks, decision trees, support vector machines, linear regression models, and Bayesian networks. As described in further detail below, the freelancer data integration system can utilize a "freelancer development machine learning model" such as a neural network to generate suggested actions and/or predict results of such actions with respect to a variety of freelancer data categories.

Relatedly, the term "neural network" refers to a machine learning model that can be trained and/or tuned based on inputs to determine classifications, scores, or approximate unknown functions. For example, a neural network includes a model of interconnected artificial neurons (e.g., organized in layers) that communicate and learn to approximate complex functions and generate outputs (e.g., generated recommendation scores) based on a plurality of inputs provided to the neural network. In some cases, a neural network refers to an algorithm (or set of algorithms) that implements deep learning techniques to model high-level abstractions in data. A neural network can include various layers such as an input layer, one or more hidden layers, and an output layer that each perform tasks for processing data. For example, a neural network can include a deep neural network, a convolutional neural network, a recurrent neural network (e.g., an LSTM), a graph neural network, or a generative adversarial neural network.

Additional detail regarding the freelancer data integration system will now be provided with reference to the figures. For example, FIG. 1 illustrates a schematic diagram of an example system environment for implementing a freelancer data integration system 102 in accordance with one or more implementations. An overview of the freelancer data integration system 102 is described in relation to FIG. 1. Thereafter, a more detailed description of the components and processes of the freelancer data integration system 102 is provided in relation to the subsequent figures.

As shown, the environment includes server(s) 104, a client device 108, a database 114, third party system(s) 116, and a network 112. Each of the components of the environment can communicate via the network 112, and the network 112 may be any suitable network over which computing devices can communicate. Example networks are discussed in more detail below in relation to FIGS. 11-12.

As mentioned above, the example environment includes a client device 108. The client device 108 can be one of a variety of computing devices, including a smartphone, a tablet, a smart television, a desktop computer, a laptop computer, a virtual reality device, an augmented reality device, or another computing device as described in relation to FIGS. 11-12. The client device 108 can communicate with the server(s) 104 and/or the database 114 via the network 112. For example, the client device 108 can receive user input from respective users interacting with the client device 108 (e.g., via the client application 110) to, for instance, interact with a freelancer account of the freelancer data integration system 102. In addition, the freelancer data integration system 102 on the server(s) 104 can receive information relating to various interactions with content items and/or user interface elements based on the input received by the client device 108 (e.g., to access freelancer data, applications, and so forth). Also, the freelancer data integration system 102 can utilize a freelancer development model 118 to generate development suggestions (i.e., suggested actions for business development corresponding to a freelancer account) based on freelancer information and interaction parameters derived from user interactions with a freelancer account of the freelancer data integration system 102 over a period of time (e.g., as described below in relation to FIG. 2).

As shown, the client device 108 can include a client application 110. In particular, the client application 110 may be a web application (e.g., accessed via a web browser), a native application installed on the client device 108 (e.g., a mobile application, a desktop application, etc.), or a cloud-based application where all or part of the functionality is performed by the server(s) 104. Based on instructions from the client application 110, the client device 108 can present or display information, including a user interface such as a freelancer account summary interface that includes depictions of freelancer data, interactions, and/or suggestions in a listing, a collection of windows or widgets, or other interfaces for presenting freelancer data to a user via the client application 110 on the client device 108.

As illustrated in FIG. 1, the example environment also includes the server(s) 104. The server(s) 104 may generate, track, store, process, receive, and transmit electronic data, such as digital resources, content items, freelancer data, user interactions with a freelancer account, and/or interactions between user accounts or client devices. For example, the server(s) 104 may receive data from the client device 108 in the form of a request to initiate (i.e., create, open) a freelancer account (as further described below in relation to FIG. 3). In addition, the server(s) 104 can transmit data to the client device 108 in the form of a content item, a comment, a data entry, a message, a scheduled event, or some other information. Indeed, the server(s) 104 can communicate with the client device 108 to send and/or receive data via the network 112. In some implementations, the server(s) 104 comprise(s) a distributed server where the server(s) 104 include(s) a number of server devices distributed across the network 112 and located in different physical locations. The server(s) 104 can comprise one or more content servers, application servers, communication servers, web-hosting servers, machine learning server, and other types of servers.

As shown in FIG. 1, the server(s) 104 can also include the freelancer data integration system 102 as part of, or otherwise linked to, a content management system 106. The content management system 106 can communicate with the client device 108 to perform various functions associated with the client application 110 such as managing user accounts, managing freelancer data, managing content items and digital resources, and facilitating user interaction with the various data sources and applications via a freelancer account. Indeed, the content management system 106 can include a network-based smart cloud storage system to manage, store, and maintain content items, digital resources, applications, and related data across numerous freelancer accounts (i.e., user accounts). In some embodiments, the freelancer data integration system 102 and/or the content management system 106 utilize the database 114 to store and access information such as digital content items, freelancer data, records of user interactions, and other information.

Although FIG. 1 depicts the freelancer data integration system 102 located on the server(s) 104, in some implementations, the freelancer data integration system 102 may be implemented by (e.g., located entirely or in part) on one or more other components of the environment. For example, the freelancer data integration system 102 may be implemented by the client device 108, and/or a third-party device. For example, the client device 108 can download all or part of the freelancer data integration system 102 for implementation independent of, or together with, the server(s) 104.

As further shown in FIG. 1, the environment may include third-party system(s) 116. Third-party systems 116 can include computer systems with which the freelancer data integration system 102 communicates to provide data, request actions, and receive data. In some embodiments, the freelancer data integration system 102 can provide data to each third-party system 116 through an API specific to a given third-party system 116. In return, the freelancer data integration system 102 can receive data from each third-party system 116 through an API. In some embodiments the freelancer data integration system 102 is a push/pull system where the freelancer data integration system 102 initiates the communication by either providing, via an API, data to a third-party system 116 via a push communication, or requests, with a pull communication via the API, data from the third-party system 116. In other embodiments, the freelancer data integration system 102 can establish a data communication stream between the freelancer data integration system 102 and one or more third-party systems 116 where the third-party systems 116 provide data to the freelancer data integration system 102 without receive a specific request.

In addition to the various ways in which the freelancer data integration system 102 can communicate with third-party systems 116, there are also various types of third-party systems 116. For example, third-party systems 116 can include accounting or finance systems, banking systems, government systems (e.g., business registration, federal, state, or local tax systems), insurance systems, legal systems, customer or client management systems, marketing systems, communication systems, calendar systems, as well as other that will be discussed herein. Accordingly, the freelancer data integration system 102 can communicate with various third-party systems to provide and receive various types of data within various data categories for use and analysis as will be described in more detail further below.

In some implementations, though not illustrated in FIG. 1, the environment may have a different arrangement of components and/or may have a different number or set of components altogether. For example, the client device 108 may communicate directly with the freelancer data integration system 102, bypassing the network 112. As another example, the environment may include multiple client devices, each associated with a different freelancer account. In addition, the environment can include the database 114 located external to the server(s) 104 (e.g., in communication via the network 112) or located on the server(s) 104 and/or on the client device 108.

As mentioned above, the freelancer data integration system 102 can analyze user interactions and freelancer information associated with a plurality of freelancer data categories to generated suggested actions for freelancer development. For example, FIG. 2 illustrates the freelancer data integration system 102 utilizing a freelancer development model 216 to generate a suggested action 218 based on interaction parameters 210 and freelancer information 212 associated with a freelancer account.

Figure 2:
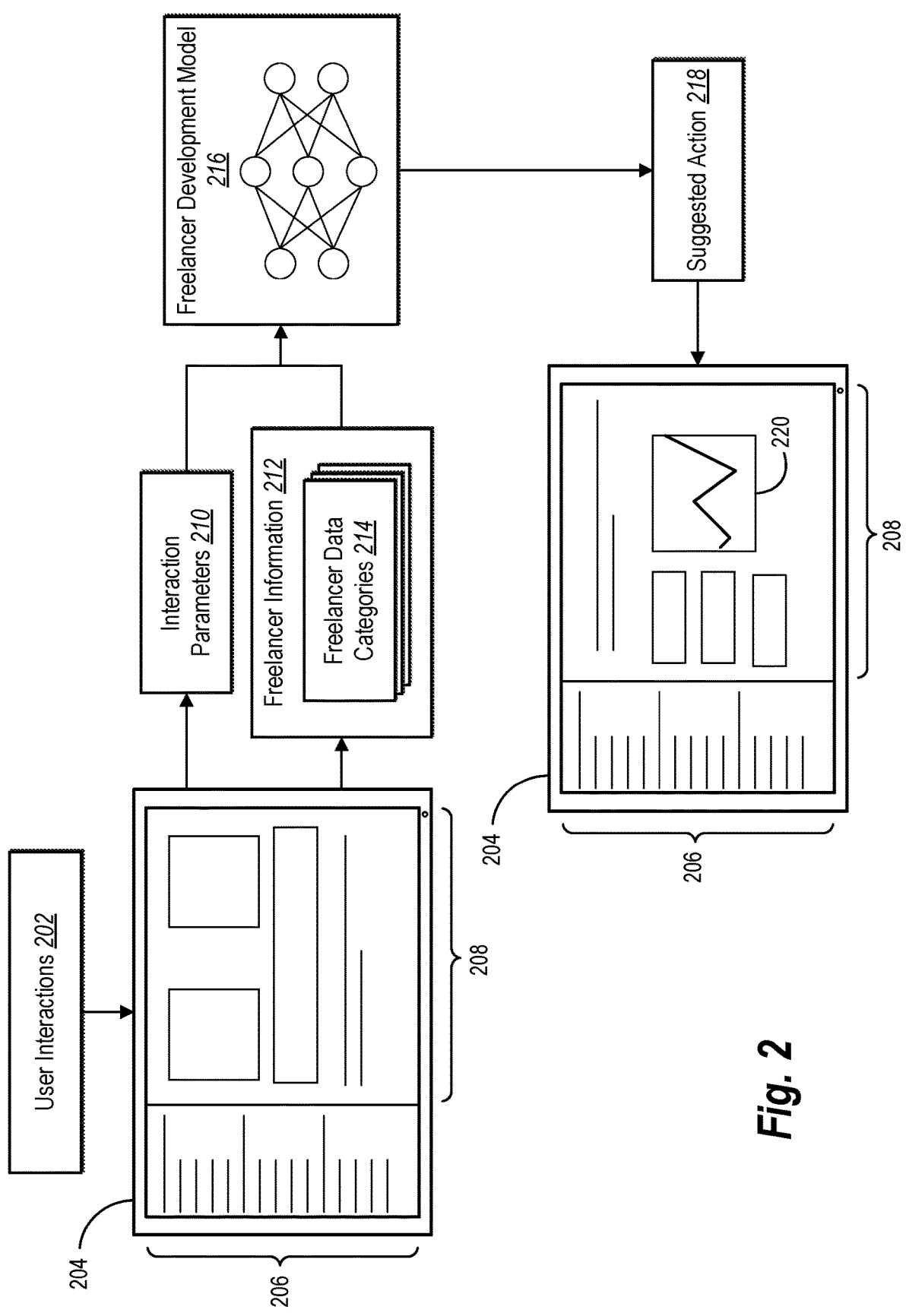
FIG. 2 illustrates an example overview of generating and providing suggestions for freelancer development in accordance with one or more embodiments.

As shown in FIG. 2, the freelancer data integration system 102 identifies (or receives) user interactions 202 associated with a user interface 204 of a freelancer account. As shown, the user interface 204 of the freelancer data integration system 102 includes a listing of menus 206 corresponding to and providing additional access to a variety of freelancer data categories 214 and a freelancer account summary interface 208. Additional details of the menus 206, the freelancer account summary interface 208, and various exemplary freelancer data categories are provided below in relation to FIGS. 4-6.

As further illustrated in FIG. 2, the freelancer data integration system 102 considers the user interaction 202 with the freelancer account (e.g., over a period of time) to determine the interaction parameters 210 for input into the freelancer development model 216. For example, the interaction parameters 210 can include a history of user interactions 202 associated with a particular freelancer data category of the plurality of freelancer data categories 214 presented in the user interface 204 (e.g., per the menus 206 and the freelancer account summary interface 208). In some cases, the interaction parameters 210 can include user interaction with a particular service provided by the freelancer data integration system 102, such as submission of a completed work product to a client or payment of an invoice via the freelancer data integration system 102.

Moreover, as illustrated in FIG. 2, the freelancer data integration system 102 determines the freelancer information 212 associated with the freelancer data categories 214 for further input into the freelancer development model 216. The freelancer information 212, for example, can include but is not limited to financial information, banking information, tax information, client information, leads, team member profiles and activities, budgets, investments, and so forth.

As mentioned above, one advantage of the freelancer data integration system 102 is that by communicating with multiple third-party systems 116, the freelancer data integration system 102 has access to unique combinations of data categories on which to perform analysis to generate suggested actions and generate predicted results of the suggested actions. For example, the freelancer data integration system 102 can track (e.g., based on tracking interaction parameters 201) data categories with which a user spends time interacting and generate suggestions accordingly. As an example, the freelancer data integration system 102 can determine that a user is spending 80% of their time working on short-term client accounts, while spending only 2% of their time in generating new client leads. The freelancer data integration system 102 determines a user's time allocation associated with data categories by tracking interaction parameters 210. Based on providing the interaction parameters to the freelancer development model 216, the model can generate a suggested action of increasing the user's time allocation for generating new client leads. In addition, the freelancer data integration system 102 can generate predictions based on whether a user completes the suggested action. For example, the freelancer data integration system 102 can generate a revenue chart predicting a decrease in revenue over time if the user does not increase time allocation to generating new clients, while on the other hand, the freelancer data integration system 102 can predict an increase in revenue depending on the amount of time allocation increase a user may perform.

The freelancer data integration system 102 make the above example possible because the freelancer development model 216 is trained and has access to the various data categories to allow the model to make logical connections between data categories having data received from various third-party systems. For example, the freelancer data integration system 102 can determine an average time per client project (from the content management system), an average revenue per project (from a banking system), the total number of current projects (from a project management system), an amount of time needed to devote toward lead generation to obtain a new project (from historical lead generation activity), and a current time allocation based on interaction parameters 210 (from the freelancer data integration system 102). From that information, the freelancer data integration system 102 can then generate predications based on current actions a user is taking within the freelancer data integration system 102 and use those predictions to generate suggested actions.

Accordingly, in some embodiments, the freelancer data integration system 102 identifies, tracks, and/or analyzes the user interactions 202 and the freelancer information 212 associated with the plurality of freelancer data categories 214 utilizing the freelancer development model 216 to generate the suggested action 218 for freelancer development. For example, suggested action 218 can include but is not limited to contacting a lead, seeking and/or reaching out to potential leads, completing a project (e.g., a contracted work product), signing a document, communicating with a team member or support service, and additional examples described herein.

As previously mentioned, in some embodiments, the freelancer development model 216 comprises a machine learning model trained to generate development suggestions based on interaction parameters 210 and freelancer information 212. For example, in some embodiments, the freelancer data integration system 102 trains a freelancer development machine learning model based on sample data associated with one or more freelancer accounts. In some cases, the freelancer account to which the freelancer information 212 and the user interactions 202 correspond provides historical data as input for training the freelancer development model 216. Additionally or alternatively, the freelancer data integration system 102 samples data from other freelancer accounts for which ground truth data (i.e., results of development actions) is available.

Moreover, as shown in FIG. 2, the freelancer data integration system 102 displays the suggested action 218 within the user interface 204. In some embodiments, the freelancer data integration system 102 also displays a visual representation 220 of a predicted result of the suggested action 218, the predicted result corresponding to one or more of the freelancer data categories 214. For example, the visual representation 220 can include but is not limited to a graphical projection of revenue, funds, new projects, new clients, and so forth. Additional example of suggested actions, predicted results, and corresponding visual representations are provided below in relation to FIGS. 7-9.

Figure 3:
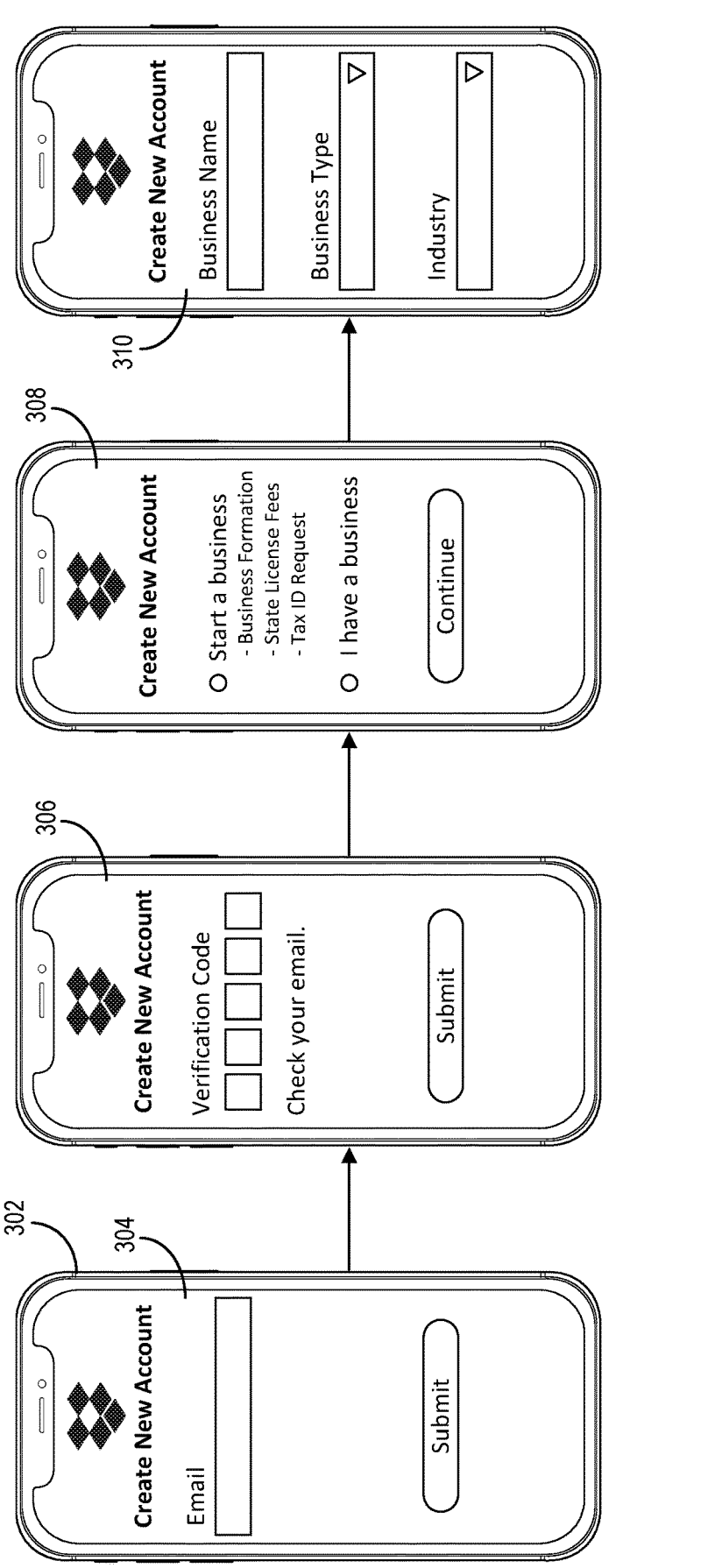
FIG. 3 illustrates an example overview of creating a freelancer account of a freelancer data integration system in accordance with one or more embodiments.

As mentioned above, the freelancer data integration system 102 can provide a user interface for initiating (i.e., creating) a freelancer account for a freelancer or small business. For example, FIG. 3 illustrates the freelancer data integration system 102 implementing an exemplary process for opening a freelancer account using a client device 302. While FIG. 3 presents the client device 302 as a mobile device (i.e., a mobile phone), embodiments can include any client device configured to access the freelancer data integration system 102, such as described herein in relation to FIGS. 1 and 11-12.

As shown in FIG. 3, the freelancer data integration system 102 provides a user, via prompt 304 on the client device 302, with an option to create a new account by entering an email address to which the new account is to be associated. Alternatively, the freelancer data integration system 102 can request other contact information for the user, such as a phone number, physical mailing address, and so forth. In response to receiving an email address (or other contact information) for the user, the freelancer data integration system 102 transmits a verification code to the submitted address and, via prompt 306 on the client device 302, requests that the user enter the verification code to verify the submitted contact information and the user's identity.

Moreover, as illustrated, the freelancer data integration system 102 provides the user, via prompt 308 on the user device 302, with options for entering information associated with an existing business registration or for proceeding to register a new business entity utilizing the freelancer data integration system 102. Accordingly, the freelancer data integration system 102 prompts the user, at prompt 310 on the user device 302 to enter a new or existing business name, a business type (e.g., a Limited Liability Company), and an industry of operations (e.g., web development). Further, in some embodiments, the freelancer data integration system 102 provides, via the user interface of the device 302, additional options for configuring a new freelancer account, such as but not limited to prompts for the user to define initial goals, time allocations, and other freelancer information.

Based upon receiving information associated with creating a new business, the freelancer data integration system can provide that information directly to a third-party system (e.g., third-party systems 116 of FIG. 1) to initiate the process of registering the business. For example, the freelancer data integration system 102 can communicate through an API or other communication interface with a government business registration service to initiate the legal creation of the new business using the information obtained via prompts 308 and 310. In this way, not only does a user create a new account within the freelancer data integration system 102, but the same information is then seamlessly passed to the government business registration service to register the new business without the user having to perform separate steps. If fees for business registration are required, payment information can also be requested and included within the initial setup process illustrated in FIG. 3.

Figure 4:
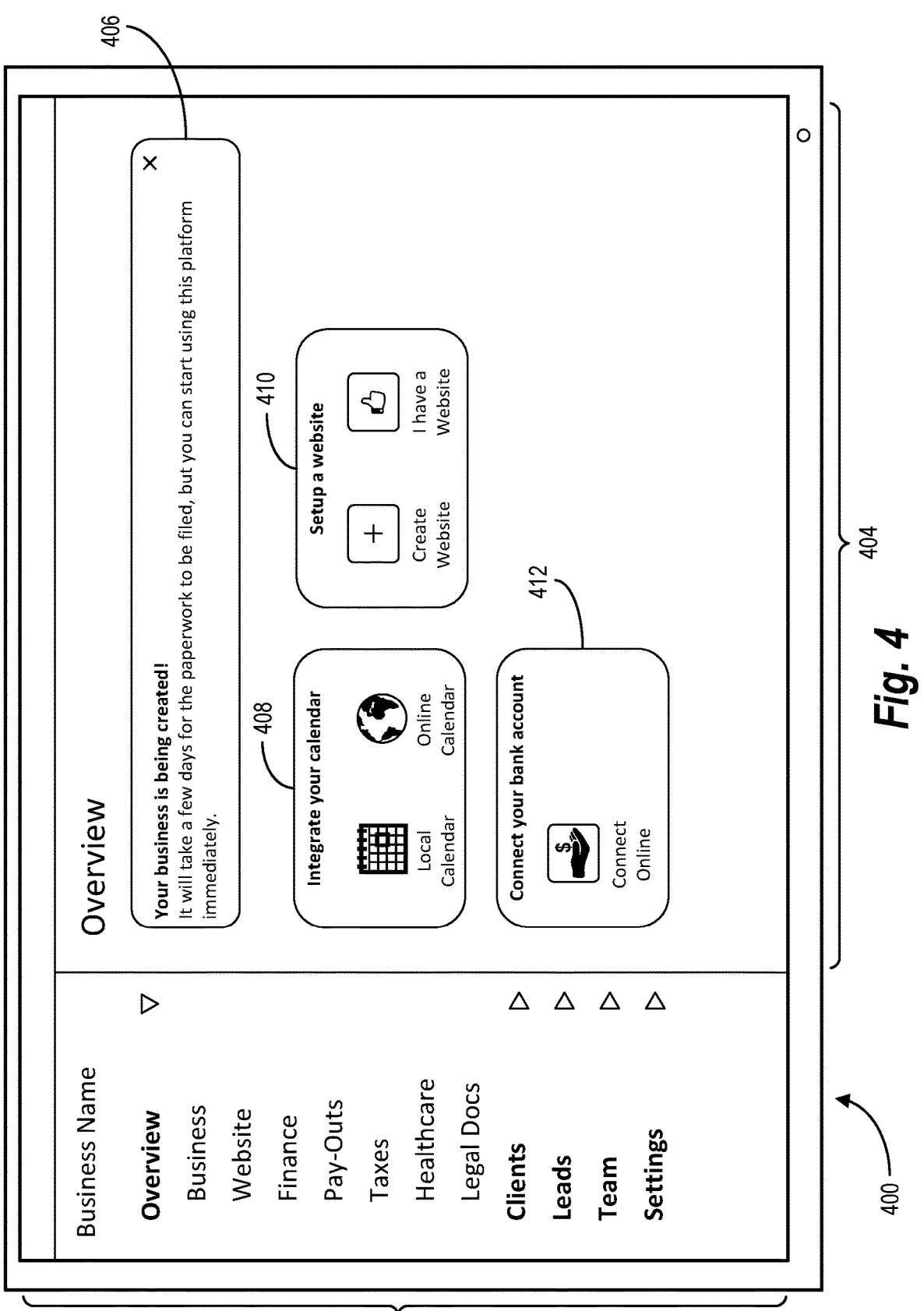
FIG. 4 illustrates an example freelancer account interface for presenting an initial freelancer account overview in accordance with one or more embodiments.

As mentioned above, the freelancer data integration system 102 can provide a user interface for collaboration of a variety of freelancer data categories in a centralized environment. For example, FIG. 4 illustrates the freelancer data integration system 102 providing categorical menus 402 and a freelancer account summary interface 404 within a user interface 400 on a client device. In particular, FIG. 4 shows the freelancer data integration system 102 providing, via the freelancer account summary interface 404, various additional prompts and selectable options for configuring the depicted freelancer account and/or entering additional freelancer information to be incorporated therein.

For instance, the freelancer account summary interface 404 includes a notification 406 indicating that the appropriate information has been received for registration of a new business entity and that the freelancer account is ready to use. As described above, after providing business registration information to a government business registration service, the freelancer data integration system 102 can receive in return status updates from the government business registration service and provide those updates in the user interface. As shown in FIG. 4, the notification 406 indicates a status that the business registration information has been submitted and is being processed. Once the government business registration service completes the business registration process, the freelancer data integration system 102 can receive information indicating the business registration process is complete and the notification 406 can update to indicate the completion of the business registration.

Further, as illustrated in FIG. 4, the freelancer account summary interface 404 of user interface 400 provides various selectable options for consolidating additional freelancer data categories and/or data sources within the centralized environment of the freelancer account. For instance, window 408 provides selectable options for integrating (e.g., synchronizing) a local or online calendar with the freelancer account by communicating with third-party services 116, as described above. With one or more calendars integrated or synchronized, in some embodiments, the freelancer data integration system 102 can provide notifications within the user interface 400 and can utilize information from the calendar to determine interaction parameters and freelancer information for generating freelancer development suggestions (e.g., as described above in relation to FIG. 2).

As also shown in FIG. 4, the freelancer account summary interface includes window 410 with selectable options for creating a website and/or integrating (e.g., linking) a website to the freelancer data integration system 102 as an addition third-party service with which the freelancer data integration system 102 can communicate. With one or more websites integrated with or linked to the freelancer account, the freelancer data integration system 102 can receive and analyze website data (e.g., website analytics data), provide notifications associated with the website within the user interface 400, provide direct access to the website (e.g., via the "Website" menu shown within the menus 402), and/or utilize the website data to further determine interaction parameters and freelancer information for generating freelancer development suggestions (e.g., as described above in relation to FIG. 2).

In addition, as shown in FIG. 4, the freelancer account summary interface includes window 412 with a selectable option for integrating (e.g., connecting) a bank account (or other financial account(s)) to the freelancer data integration system 102. With a bank account and/or other financial account connected to the freelancer account, the freelancer data integration system 102 can provide access, within the user interface 400, to funds, payments, and financial records, and can implement automated processes for receipt of payments from clients, among other amenities and conveniences. Also, in one or more embodiments, the freelancer data integration system 102 can utilize financial data from connected or otherwise integrated bank/financial accounts to further determine interaction parameters and freelancer information for generating development suggestions (e.g., as described above in relation to FIG. 2).

While not depicted in FIG. 4, in some embodiments, the freelancer data integration system 102 can provide additional windows and/or alternative selectable graphics for integrating, synchronizing, linking, creating, and/or connecting native or third-party resources associated with additional freelancer data categories.

Figure 5:
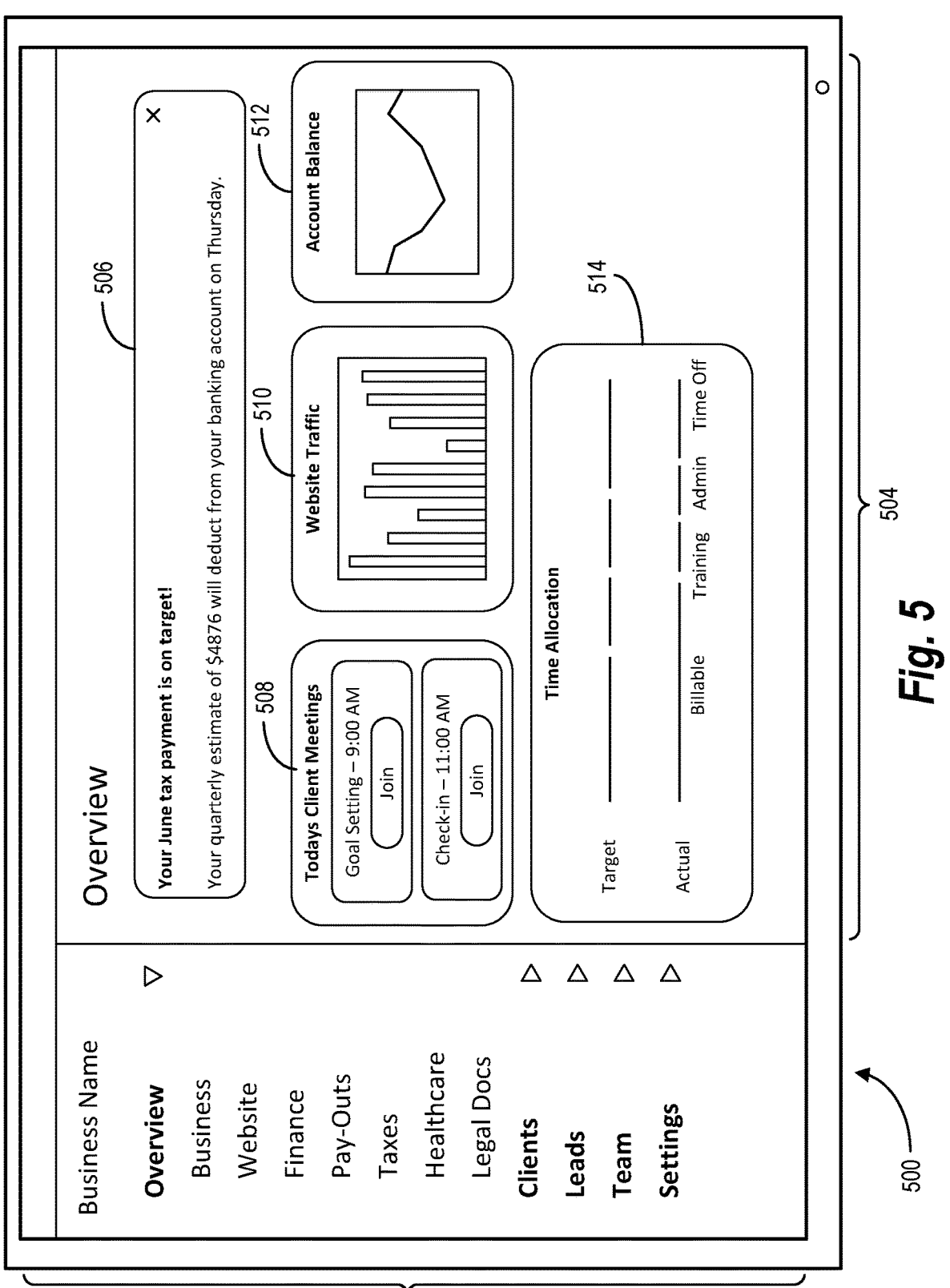
FIG. 5 illustrates an example freelancer account interface for presenting an ongoing freelancer account overview in accordance with one or more embodiments.

As mentioned above, the freelancer data integration system 102 can provide a user interface for active collaboration of a variety of freelancer data categories in a centralized environment. For example, FIG. 5 illustrates the freelancer data integration system 102 providing categorical menus 502 and a freelancer account summary interface 504 within a user interface 500 on a client device. In particular, FIG. 5 shows the freelancer data integration system 102 providing, via the freelancer account summary interface 504, various additional prompts and selectable options for ongoing interaction with the depicted freelancer account. For instance, the freelancer account summary interface 504 includes a notification 506 indicating that a tax payment is scheduled to take place at a later date.

Further, as illustrated in FIG. 5, the freelancer account summary interface 504 of user interface 500 provides various selectable options for interacting with various pertinent categories of freelancer data, such as scheduled meetings, website management, financial account monitoring, time allocations, and so forth. For instance, window 508 provides notifications of upcoming scheduled events (e.g., meetings with team members, clients, and/or leads) and selectable options for joining the scheduled events online.

As also shown in FIG. 5, window 510 within the freelancer account summary interface 504 provides a graphical representation of website traffic over a discrete period of time. Also, window 512 within the freelancer account summary interface 504 provides a graphical representation of an account balance for a financial account associated (and linked to) the freelancer account via the freelancer data integration system 102. Further, window 514 within the freelancer account summary interface 504 depicts target and actual time allocations associated with freelancer data categories and/or freelancer development efforts. As shown, for example, the window 514 shows relative allocations for time spent on billable work, training, administrative activity, and time taken off during regular work hours.

Indeed, the freelancer data integration system 102 can provide visual representations and/or selectable options within the user interface 500 for any freelancer data category integrated with the freelancer account. In some embodiments, the freelancer data integration system 102 intelligently selects the most pertinent freelancer data categories to present within the freelancer account summary interface 504, such as but not limited to notifications of upcoming events or deadlines, visual representations of recently updated freelancer data categories, display of frequently used freelancer information, and data representations selected based on historic user interactions with the freelancer account.

As illustrated in FIGS. 4-5, the freelancer data integration system 102 can provide access to a variety of functions associated with a variety of freelancer data categories, such as but not limited to business, website, finance, banking, pay-outs, taxes, healthcare, legal documents, clients, leads, team, and freelancer account settings. Finance, for example, can include financial projections based on pending and/or completed freelance projects across one or more clients, invoice and payment issuance and tracking, and so forth. Taxes, for example, can include tax information and overall tax requirements based on country and state of operation, client- and project-specific tax breakdowns, third-party tax software integration, and so forth.

Health insurance, for example, can include insurance premium projections, information based on business type and/or area, and so forth. Legal documents, for example, can include one-click signatures for contracts and other shortcuts for signing/reviewing legal documents, and so forth. Client information, for example, can include client-specific and/or project-specific time clocks for tracking time spent on freelance projects, visualization of client and project time spent, and so forth. Leads, for example, can include, intelligent lead suggestions, lead activity such as communications, views, conversations, advertising, and so forth. Team, for example, can include communication with team members based on project progress, most recent status (e.g., whose turn it is to perform a task or subtask), and so forth. Indeed, the freelancer data integration system 102 can provide for display on a client device, visual representation, notifications, and selectable options for these and other freelancer data categories to implement holistic collaboration and centralization of freelancer development activities.

Figure 6:
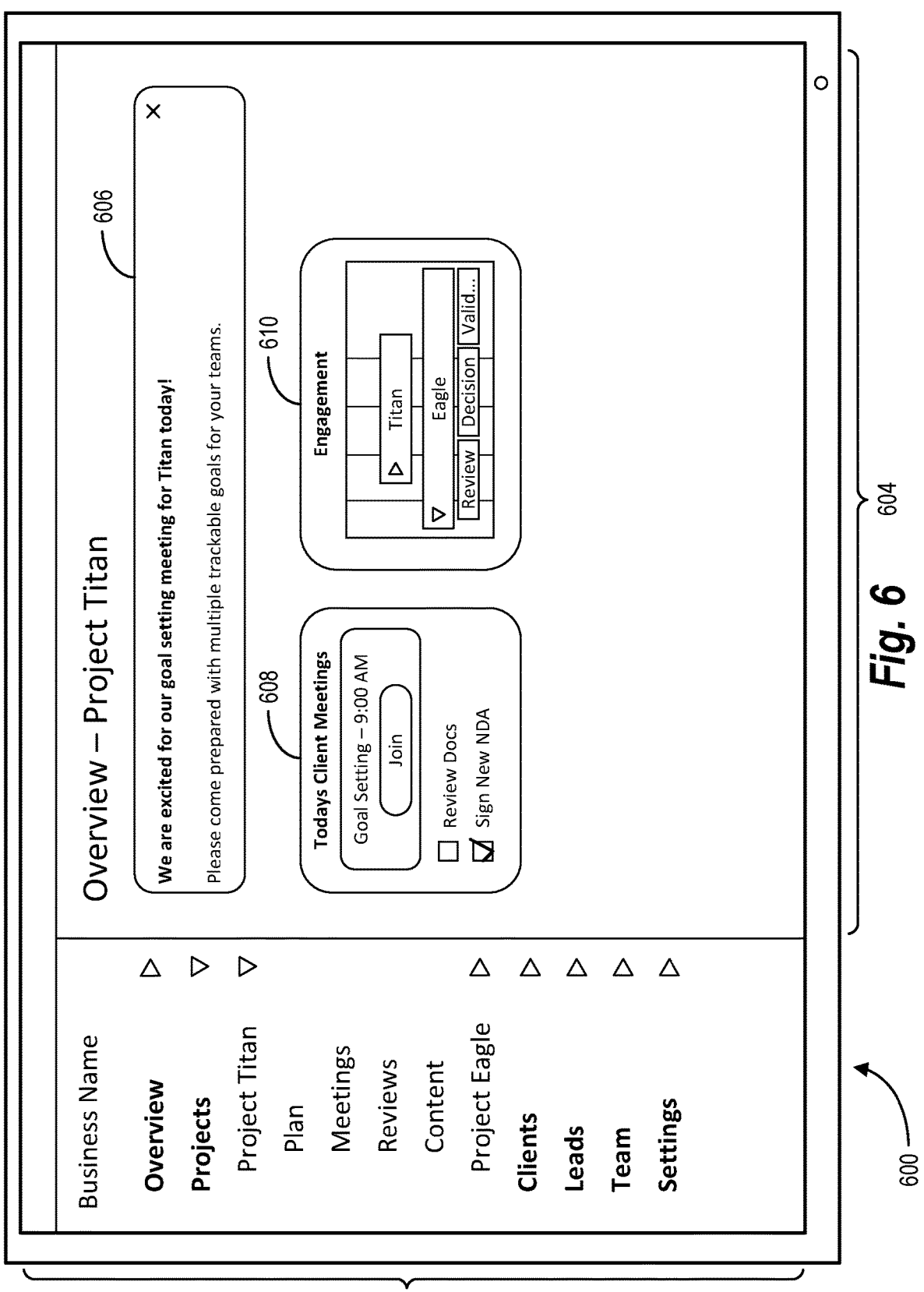
FIG. 6 illustrates an example freelancer account interface for presenting an overview of a freelancer data category in accordance with one or more embodiments.

As mentioned above, the freelancer data integration system 102 can provide a user interface for active collaboration of a variety of freelancer data categories in a centralized environment. For example, FIG. 6 illustrates the freelancer data integration system 102 providing categorical menus 602 and a freelancer account summary interface 604 within a user interface 600 on a client device. In particular, FIG. 6 shows the freelancer data integration system 102 providing, via the freelancer account summary interface 604 and the menus 602, a category-specific account summary interface including information associated with a freelancer data category selected from the menus 602. For instance, the freelancer account summary interface 604 includes a notification 606 including information about a scheduled event and suggested actions related to preparation for the scheduled event.

Further, as illustrated in FIG. 6, the freelancer account summary interface 604 of user interface 600 provides various notifications, graphical representations, and selectable options specific to the selected freelancer data category (in the illustrated case, an overview of a current freelancer project). For instance, the window 608 within the freelancer account summary interface 604 provides information associated with upcoming scheduled meetings with clients. Also, window 608 includes a checklist of actions recommended for preparation for the scheduled meeting. In some embodiments, the freelancer data integration system 102 allows a user to create such checklists for display in relation to scheduled events. Alternatively, in some embodiments, the freelancer data integration system 102 can generate a suggested checklist or other type of reminder related to a scheduled event based on, for example, freelancer information and interaction parameters associated with the event or freelancer data category.

As also shown in FIG. 6, window 610 within the freelancer account summary interface 604 provides a graphical depiction of one or more project schedules. In particular, the window 610 shows a graphical representation of schedules for two overlapping projects, with selectable options for viewing additional details corresponding to each project represented. In some embodiments, the freelancer data integration system 102 can utilize freelancer project information, including sequential or overlapping freelancer project schedules, to further determine interaction parameters and freelancer information for generating development suggestions (e.g., as described above in relation to FIG. 2).

Figure 7:
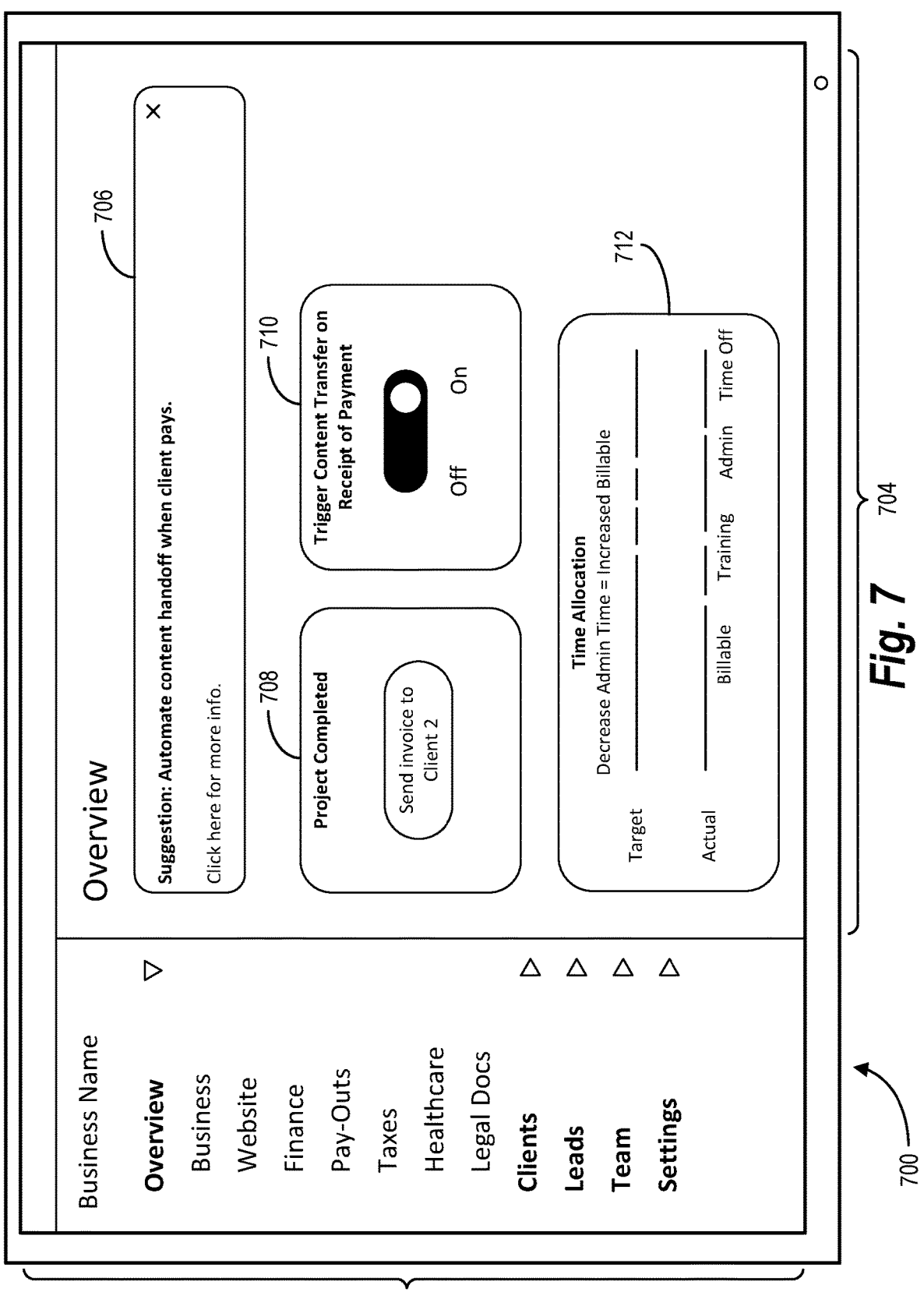
FIGS. 7-9 illustrate example freelancer account interfaces for presenting suggested actions for freelancer development utilizing a freelancer data integration system in accordance with one or more embodiments.

As mentioned above, the freelancer data integration system 102 can generate and display suggested actions for freelancer development. For example, FIG. 7 illustrates the freelancer data integration system 102 providing a suggested action for display within a user interface 700 on a client device. As shown, the user interface 700 includes a menu 702 of selectable freelancer data categories and a freelancer account summary interface 704. In particular, FIG. 7 shows the freelancer data integration system 102 providing, within the freelancer account summary interface 704 of the user interface 700, a suggested action of automating content handoff in response to receiving payment from a client for a completed work product. For instance, in some embodiments, the freelancer data integration system 102 can automate delivery of digital content to the client online or automate delivery of physical content by notifying a courier or shipping department.

As shown in FIG. 7, the freelancer data integration system 102 provides a notification 706 of the suggested action of automating content handoff within the freelancer account summary interface 704 with a selectable option to direct the user to additional information about the suggestion. Further, windows 708 and 710 are provided with selectable options for implementing (or partially implementing) the suggest action indicated by the notification 706. For instance, the window 708 includes a selectable option for sending an invoice to the client for which a project (e.g., a work product) has been completed. Also, the window 710 includes a selectable option for activating (or deactivating) automated content transfer upon receipt of payment from the respective client. In addition, a window 712 provides a visual representation of a predicted result of the suggested action, indicating a prediction that additional time for billable work may be allocated due to time saved by automating the content transfer per the suggested action of notification 706.

Figure 8:
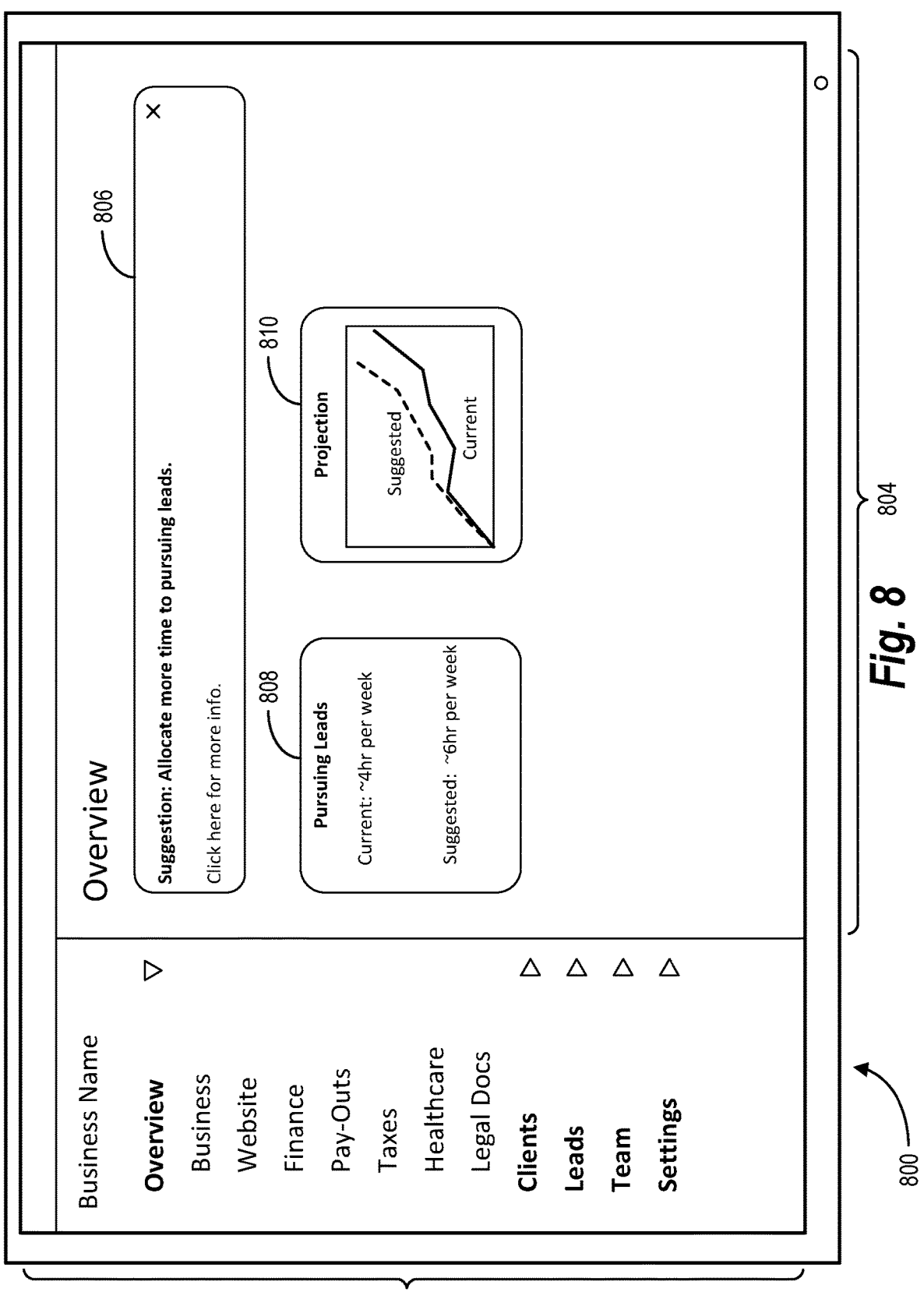

As mentioned above, the freelancer data integration system 102 can generate and display suggested actions for freelancer development. For example, FIG. 8 illustrates the freelancer data integration system 102 providing a suggested action for display within a user interface 800 on a client device. As shown, the user interface 800 includes a menu 802 of selectable freelancer data categories and a freelancer account summary interface 804. In particular, FIG. 8 shows the freelancer data integration system 102 providing, within the freelancer account summary interface 804 of the user interface 800, a suggested action of adjusting relative time allocations to apportion more time for pursuing leads. In addition, in some embodiments, the freelancer data integration system 102 can provide recommended leads, resources for finding potential leads, and so forth.

As shown in FIG. 8, the freelancer data integration system 102 provides a notification 806 of the suggested action of adjusting time allocations in favor of pursuing leads within the freelancer account summary interface 804 with a selectable option to direct the user to additional information about the suggestion. Further, windows 808 and 810 provide additional information concerning the suggested action indicated by the notification 806. For instance, the window 808 specifies a suggested approximate amount of time to spend per week compared to the current average amount of time spent, as determined, for example, by the freelancer data integration system 102 when monitoring user interactions with the freelancer account of a period of time (e.g., as described above in relation to FIG. 2). Also, the window 810 includes a visual representation of a predicted result for the suggested action, the predicted result corresponding, for example, to one of the freelancer data categories listed within the menu 802 of the user interface 800.

Figure 9:
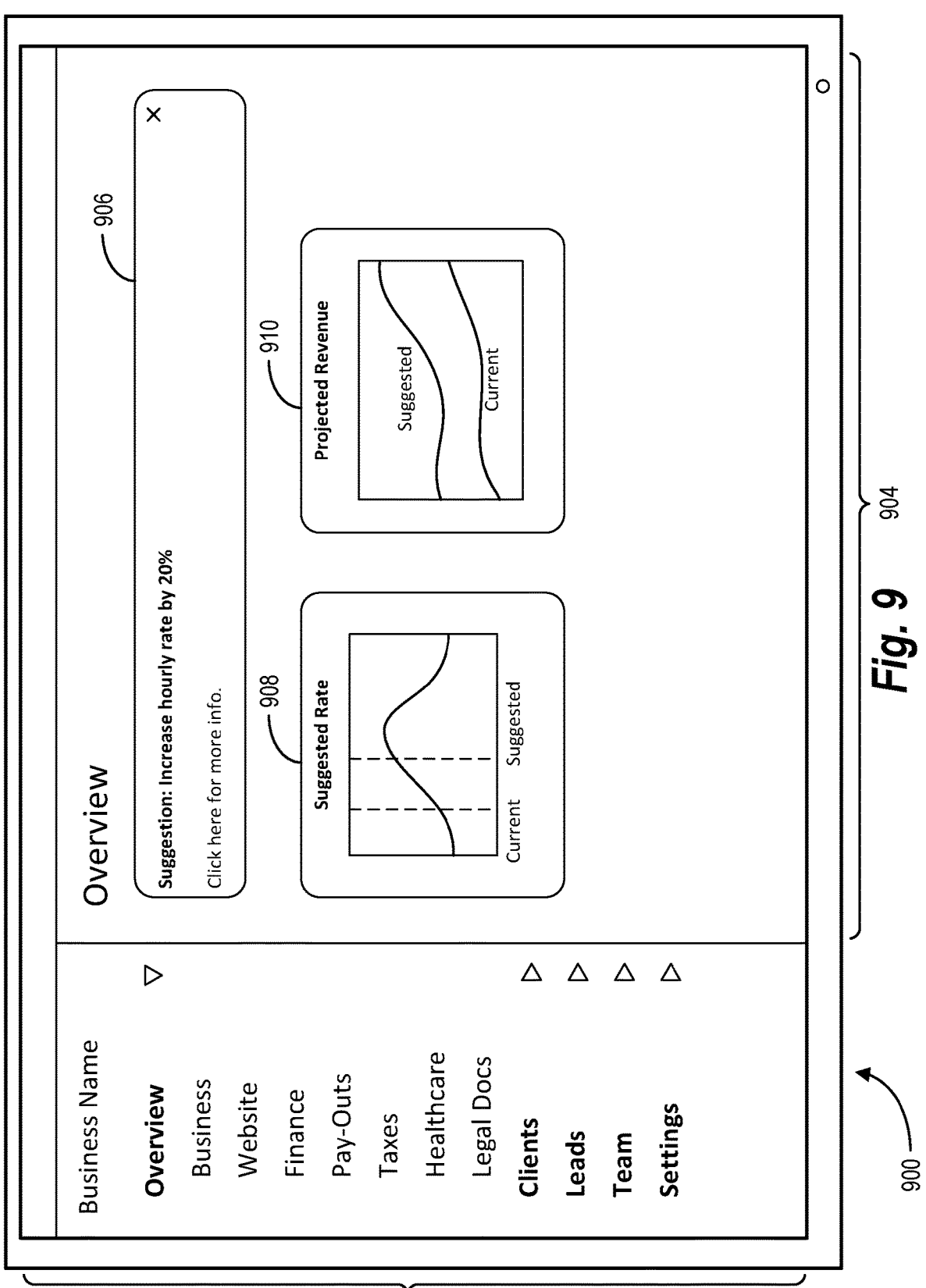

As mentioned above, the freelancer data integration system 102 can generate and display suggested actions for freelancer development. For example, FIG. 9 illustrates the freelancer data integration system 102 providing a suggested action for display within a user interface 900 on a client device. As shown, the user interface 900 includes a menu 902 of selectable freelancer data categories and a freelancer account summary interface 904. In particular, FIG. 9 shows the freelancer data integration system 102 providing, within the freelancer account summary interface 904 of the user interface 900, a suggested action of increasing an hourly rate of charge for a particular type of freelancer labor or work product. For instance, in some embodiments, the freelancer data integration system 102 can identify a current rate of charge from freelancer information associated with the freelancer account and compare the current rate to related data to determine a suggested rate of charge to suggest to a user via the user interface 900. The freelancer data integration system 102 can identify and analyze related data, for example, from other freelancer accounts within the freelancer data integration system 102 or from a third-party resource of information related to a same industry of the freelancer account.

As shown in FIG. 9, the freelancer data integration system 102 provides a notification 906 of the suggested action of increasing an hourly rate of charge by a particular amount. In the illustrated implementation, for example, the freelancer data integration system 102 generated a suggested increase in hourly rate of 20% based on freelancer information, interactions parameters based on user interactions with the freelancer account, and/or industry data related to the freelancer account. Further, window 908 within the freelancer account summary interface 904 provides background information corresponding to the suggested action of the notification 906 with a graphical representation of comparative industry rates and visual indications of the current and suggested rates relative to the comparative industry rates. Also, window 910 within the freelancer account summary interface 904 includes a visual representation of a predicted result of the suggested action indicated by the notification 906 and the window 908, the predicted result corresponding to a freelancer data category (i.e., a predicted projection of revenue).

The components of the freelancer data integration system 102 can include software, hardware, or both. For example, the components of the freelancer data integration system 102 can include one or more instructions stored on a computer-readable storage medium and executable by processors of one or more computing devices. When executed by one or more processors, the computer-executable instructions of the freelancer data integration system 102 can cause a computing device to perform the methods described herein. Alternatively, the components of the freelancer data integration system 102 can comprise hardware, such as a special purpose processing device to perform a certain function or group of functions. Additionally or alternatively, the components of the freelancer data integration system 102 can include a combination of computer-executable instructions and hardware.

Furthermore, the components of the freelancer data integration system 102 performing the functions described herein may, for example, be implemented as part of a stand-alone application, as a module of an application, as a plug-in for applications including content management and/ or data integration applications, as a library function or functions that may be called by other applications, and/or as a cloud-computing model. Thus, the components of the freelancer data integration system 102 may be implemented as part of a stand-alone application on a personal computing device or a mobile device.

FIGS. 1-9, the corresponding text, and the examples provide a number of different systems and methods for consolidating data of a variety of freelancer data categories, presenting a freelancer account interface including a summary interface of the various freelancer data categories, and generating suggested actions for freelancer development based on freelancer information and user interactions. In addition to the foregoing, implementations can also be described in terms of flowcharts comprising acts or steps in a method for accomplishing a particular result. For example, FIG. 10 illustrates an example series of acts for generating and providing a suggested action for freelancer development within a freelancer account.

Figure 10:
FIG. 10 illustrates a flowchart of a series of acts for generating and providing a suggested action based on freelancer information and interaction parameters in accordance with one or more embodiments.
Figure 10:
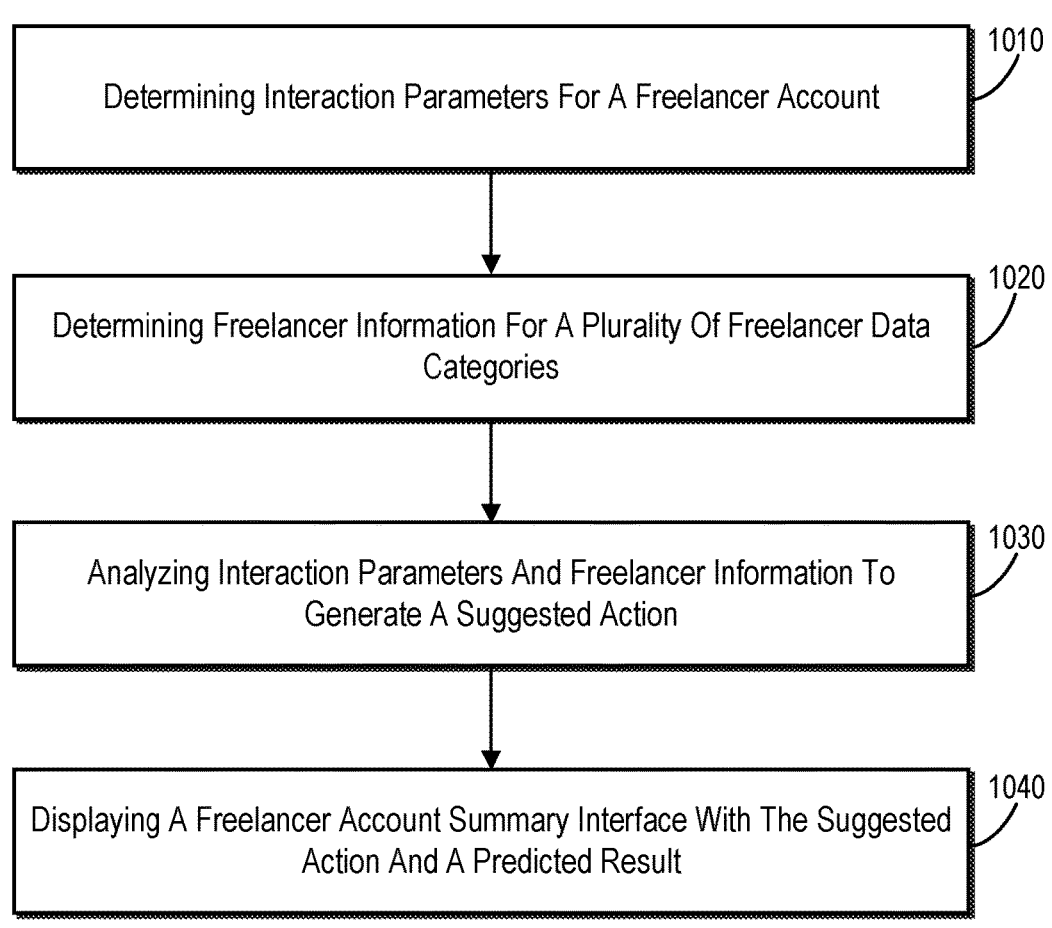

While FIG. 10 illustrates acts according to certain implementations, alternative implementations may omit, add to, reorder, and/or modify any of the acts shown in FIG. 10. The acts of FIG. 10 can be performed as part of a method. Alternatively, a non-transitory computer readable medium can comprise instructions, that when executed by one or more processors, cause a computing device to perform the acts of FIG. 10. In still further implementations, a system can perform the acts of FIG. 10.

As illustrated in FIG. 10, the series of acts 1000 includes an act 1010 of determining interaction parameters for a freelancer account. In particular, the act 1010 can include determining interaction parameters, the interaction parameters based on user interactions associated with a freelancer account over a period of time. In some embodiments, the act 1010 involves identifying user interactions associated with a freelancer account over a period of time and determining the interaction parameters based on the user interactions.

Further, in some embodiments, the interaction parameters are further based on historical user interactions associated with freelancer accounts other than the freelancer account. In one or more embodiments, the user interactions associated with the freelancer account comprise relative allocations of user interactions corresponding to the plurality of freelancer data categories.

In addition, the series of acts 1000 includes an act 1020 of determining freelancer information for a plurality of freelancer data categories. In particular, the act 1020 can include determining, for the freelancer account, freelancer information associated with a plurality of freelancer data categories. Further, in some embodiments, the plurality of freelancer data categories comprises one or more of financial, tax, insurance, legal, clients, leads, employees, teams, or projects.

Further, the series of acts 1000 includes an act 1030 of analyzing interaction parameters and freelancer information to generate a suggested action. In particular, the act 1030 can include analyzing the interaction parameters and the freelancer information to generate a suggested action for the freelancer account, the suggested action associated with a first freelancer data category from the plurality of freelancer data categories. In one or more embodiments, the suggested action comprises a suggested increase or decrease in the relative allocations of user interactions corresponding to the first freelancer data category. Moreover, in some embodiments, the suggested action comprises a suggested increase or decrease in relative allocations of user interactions with the freelancer account. In addition, in some embodiments, the suggested action is further associated with a second freelancer data category of the plurality of freelancer data categories.

Moreover, in one or more embodiments, the act 1030 involves identifying an activated trigger corresponding to a particular user interaction with the freelancer account and generating the suggested action for the freelancer account based at least in part on identifying the activated trigger.

Further, in some embodiments, the act 1030 includes utilizing a trained machine learning model to generate the suggested action based on the interaction parameters and the freelancer information. In one or more embodiments, the act 1030 involves generating the suggested action utilizing a machine learning model, the machine learning model trained with historical data associated with freelancer accounts other than the freelancer account.

As further illustrated in FIG. 10, the series of acts 1000 includes an act 1040 of displaying a freelancer account summary interface with the suggested action and a predicted result. In particular, the act 1040 can include providing, for display on a client device associated with the freelancer account, a freelancer account summary interface comprising a notification of the suggested action together with visual representation of a predicted result associated with the first freelancer data category based on the suggested action.

Further, in one or more embodiments, the freelancer account summary interface further comprises a second predicted result based on the suggested action associated with the first freelancer data category, the second predicted result associated with a second freelancer data category of the plurality of freelancer data categories. Moreover, in some embodiments, the freelancer account summary interface further comprises a second predicted result based on the suggested action, the second predicted result associated with the second freelancer data category.

Embodiments of the present disclosure may comprise or utilize a special purpose or general-purpose computer including computer hardware, such as, for example, one or more processors and system memory, as discussed in greater detail below. Implementations within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, implementations of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some implementations, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Implementations of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 11:
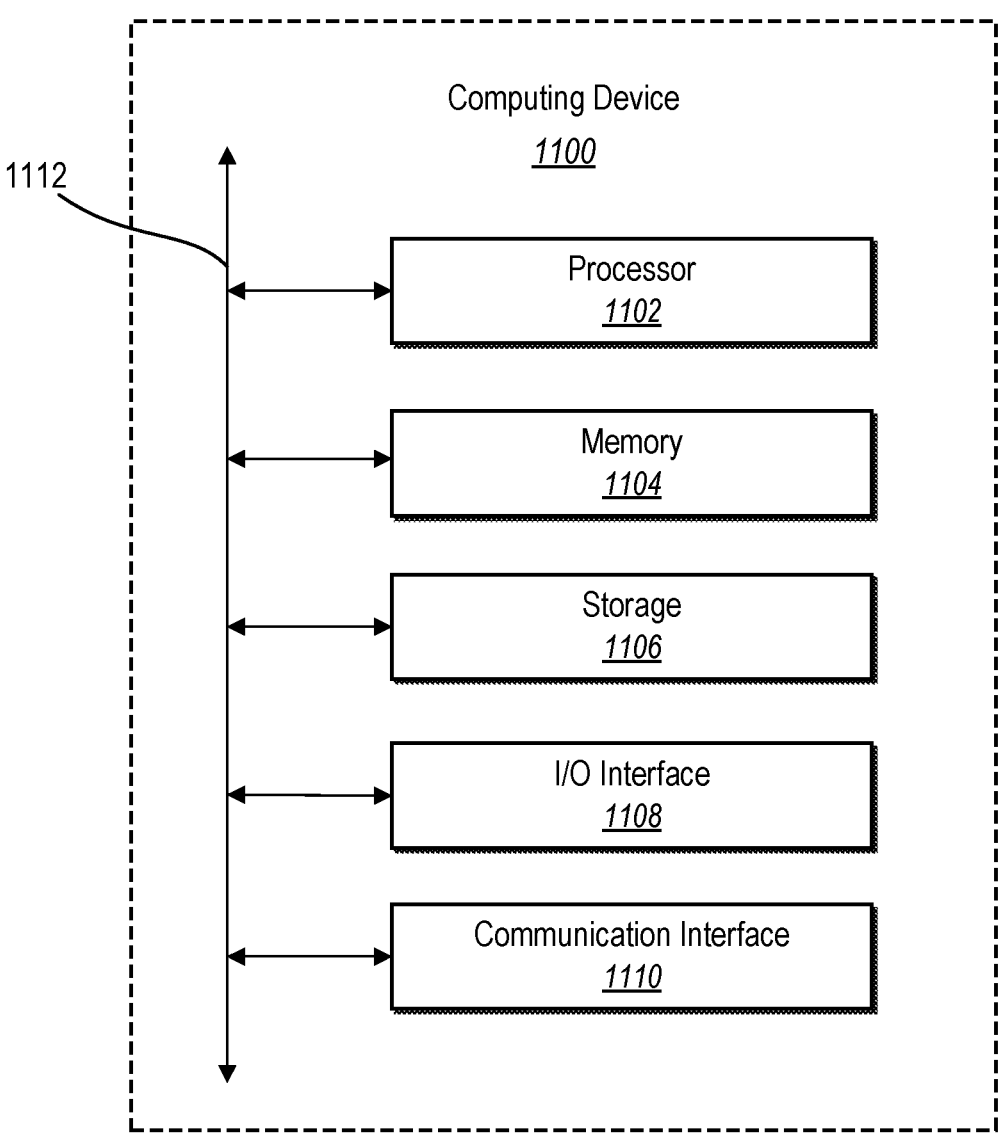
FIG. 11 illustrates a block diagram of an example computing device in accordance with one or more embodiments.

FIG. 11 illustrates a block diagram of exemplary computing device 1100 (e.g., the server(s) 104 and/or the client device 108) that may be configured to perform one or more of the processes described above. One will appreciate that server(s) 104 and/or the client device 108 may comprise one or more computing devices such as computing device 1100. As shown by FIG. 11, computing device 1100 can comprise processor 1102, memory 1104, storage device 1106, I/O interface 1108, and communication interface 1110, which may be communicatively coupled by way of communication infrastructure 1112. While an exemplary computing device 1100 is shown in FIG. 11, the components illustrated in FIG. 11 are not intended to be limiting. Additional or alternative components may be used in other implementations. Furthermore, in certain implementations, computing device 1100 can include fewer components than those shown in FIG. 11. Components of computing device 1100 shown in FIG. 11 will now be described in additional detail.

In particular implementations, processor 1102 includes hardware for executing instructions, such as those making up a computer program. As an example, and not by way of limitation, to execute instructions, processor 1102 may retrieve (or fetch) the instructions from an internal register, an internal cache, memory 1104, or storage device 1106 and decode and execute them. In particular implementations, processor 1102 may include one or more internal caches for data, instructions, or addresses. As an example, and not by way of limitation, processor 1102 may include one or more instruction caches, one or more data caches, and one or more translation lookaside buffers (TLBs). Instructions in the instruction caches may be copies of instructions in memory 1104 or storage device 1106.

Memory 1104 may be used for storing data, metadata, and programs for execution by the processor(s). Memory 1104 may include one or more of volatile and non-volatile memories, such as Random Access Memory ("RAM"), Read Only Memory ("ROM"), a solid-state disk ("SSD"), Flash, Phase Change Memory ("PCM"), or other types of data storage. Memory 1104 may be internal or distributed memory.

Storage device 1106 includes storage for storing data or instructions. As an example, and not by way of limitation, storage device 1106 can comprise a non-transitory storage medium described above. Storage device 1106 may include a hard disk drive (HDD), a floppy disk drive, flash memory, an optical disc, a magneto-optical disc, magnetic tape, or a Universal Serial Bus (USB) drive or a combination of two or more of these. Storage device 1106 may include removable or non-removable (or fixed) media, where appropriate. Storage device 1106 may be internal or external to computing device 1100. In particular implementations, storage device 1106 is non-volatile, solid-state memory. In other implementations, Storage device 1106 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

I/O interface 1108 allows a user to provide input to, receive output from, and otherwise transfer data to and receive data from computing device 1100. I/O interface 1108 may include a mouse, a keypad or a keyboard, a touch screen, a camera, an optical scanner, network interface, modem, other known I/O devices or a combination of such I/O interfaces. I/O interface 1108 may include one or more devices for presenting output to a user, including, but not limited to, a graphics engine, a display (e.g., a display screen), one or more output drivers (e.g., display drivers), one or more audio speakers, and one or more audio drivers. In certain implementations, I/O interface 1108 is configured to provide graphical data to a display for presentation to a user. The graphical data may be representative of one or more graphical user interfaces and/or any other graphical content as may serve a particular implementation.

Communication interface 1110 can include hardware, software, or both. In any event, communication interface 1110 can provide one or more interfaces for communication (such as, for example, packet-based communication) between computing device 1100 and one or more other computing devices or networks. As an example, and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI.

Additionally or alternatively, communication interface 1110 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, communication interface 1110 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, communication interface 1110 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

Communication infrastructure 1112 may include hardware, software, or both that couples components of computing device 1100 to each other. As an example and not by way of limitation, communication infrastructure 1112 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

Figure 12:
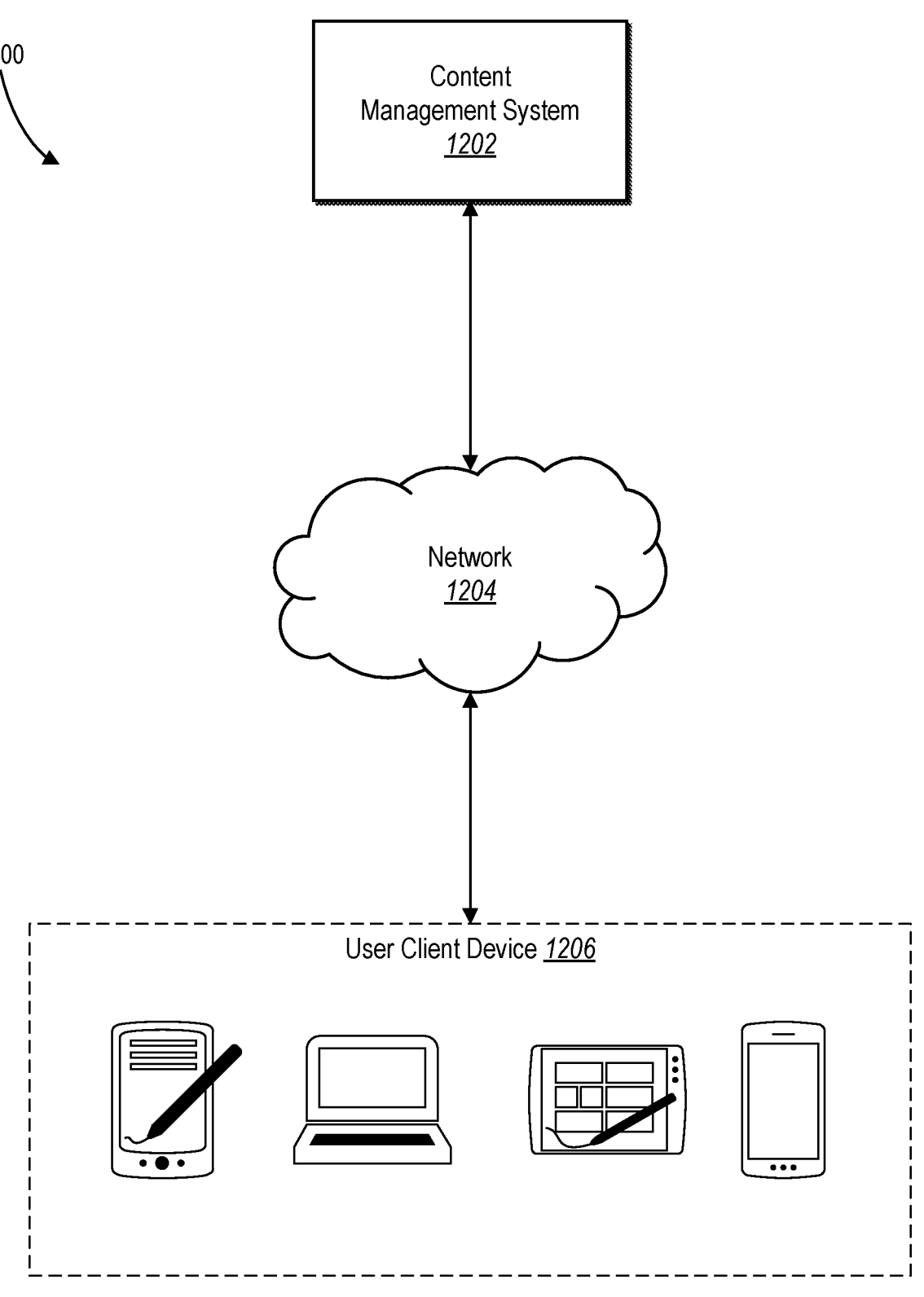
FIG. 12 illustrates an example environment of a networking system having a freelancer data integration system in accordance with one or more embodiments.

FIG. 12 is a schematic diagram illustrating environment 1200 within which one or more implementations of the freelancer data integration system 102 can be implemented. For example, the freelancer data integration system 102 may be part of, linked to, or otherwise associated with a content management system 1202 (e.g., the content management system 106). Content management system 1202 may generate, store, manage, receive, and send digital content (such as digital content items and account data). For example, content management system 1202 may send and receive digital content to and from client devices 1206 by way of network 1204. In particular, content management system 1202 can store and manage digital content. Content management system 1202 can manage the sharing of digital content between computing devices associated with a plurality of users. For instance, content management system 1202 can facilitate a user sharing a digital content with another user of content management system 1202.

In particular, content management system 1202 can manage synchronizing digital content across multiple client devices 1206 associated with one or more users. For example, a user may edit digital content using client device 1206. The content management system 1202 can cause client device 1206 to send the edited digital content to content management system 1202. Content management system 1202 then synchronizes the edited digital content on one or more additional computing devices.

In addition to synchronizing digital content across multiple devices, one or more implementations of content management system 1202 can provide an efficient storage option for users that have large collections of digital content. For example, content management system 1202 can store a digital content on content management system 1202, while the client device 1206 only stores reduced-sized versions of the digital content. A user can navigate and browse the reduced-sized versions (e.g., a thumbnail of a digital image) of the digital content on client device 1206. In particular, one way in which a user can experience digital content is to browse the reduced-sized versions of the digital content on client device 1206.

Another way in which a user can experience digital content is to select a reduced-size version of digital content to request the full- or high-resolution version of digital content from content management system 1202. In particular, upon a user selecting a reduced-sized version of digital content, client device 1206 sends a request to content management system 1202 requesting the digital content associated with the reduced-sized version of the digital content. Content management system 1202 can respond to the request by sending the digital content to client device 1206. Client device 1206, upon receiving the digital content, can then present the digital content to the user. In this way, a user can have access to large collections of digital content while minimizing the amount or number of resources used on client device 1206.

Client device 1206 may be a desktop computer, a laptop computer, a tablet computer, a personal digital assistant (PDA), an in- or out-of-car navigation system, a handheld device, a smart phone or other cellular or mobile phone, or a mobile gaming device, other mobile device, or other suitable computing devices. Client device 1206 may execute one or more client applications, such as a web browser (e.g., Microsoft Windows Internet Explorer, Mozilla Firefox, Apple Safari, Google Chrome, Opera, etc.) or a native or special-purpose client application (e.g., Dropbox Paper for iPhone or iPad, Dropbox Paper for Android, etc.), to access and view content over network 1204.

Network 1204 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which client devices 1206 may access content management system 1202.

In the foregoing specification, the present disclosure has been described with reference to specific exemplary implementations thereof. Various implementations and aspects of the present disclosure(s) are described with reference to details discussed herein, and the accompanying drawings illustrate the various implementations. The description above and drawings are illustrative of the disclosure and are not to be construed as limiting the disclosure. Numerous specific details are described to provide a thorough understanding of various implementations of the present disclosure.

The present disclosure may be embodied in other specific forms without departing from its spirit or essential characteristics. The described implementations are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

The foregoing specification is described with reference to specific exemplary implementations thereof. Various implementations and aspects of the disclosure are described with reference to details discussed herein, and the accompanying drawings illustrate the various implementations. The description above and drawings are illustrative and are not to be construed as limiting. Numerous specific details are described to provide a thorough understanding of various implementations.

The additional or alternative implementations may be embodied in other specific forms without departing from its spirit or essential characteristics. The described implementations are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A computer-implemented method comprising:
   providing, for display on a client device associated with a freelancer account of a data integration system, selectable options identifying respective third-party services available for integration with the freelancer account, the respective third-party services comprising online financial accounts, email accounts, and calendar services;
   integrating a plurality of third-party services with the freelancer account in response to receiving one or more respective user interactions with the selectable options provided on the client device, the plurality of third-party services comprising two or more of: an online financial account, an email account, an online calendar, or a local calendar of the client device;
   determining interaction parameters, the interaction parameters based on user interactions with the freelancer account via the client device over a period of time;
   determining, for the freelancer account and the plurality of third-party services integrated with the freelancer account, freelancer information associated with a plurality of freelancer data categories;
   analyzing the interaction parameters and the freelancer information to generate a suggested action for freelancer activities related to the freelancer account, the suggested action associated with a first freelancer data category from the plurality of freelancer data categories; and
   providing, for display on the client device associated with the freelancer account, a freelancer account summary interface comprising a notification of the suggested action together with a graphical representation of a predicted result over time associated with the first freelancer data category and responsive to the suggested action.

2. The computer-implemented method of claim 1, wherein the interaction parameters are further based on historical user interactions associated with freelancer accounts other than the freelancer account.

3. The computer-implemented method of claim 1, further comprising utilizing a trained machine learning model to generate the suggested action based on the interaction parameters and the freelancer information.

4. The computer-implemented method of claim 1, wherein the user interactions associated with the freelancer account comprise relative allocations of user interactions corresponding to the plurality of freelancer data categories.

5. The computer-implemented method of claim 4, wherein the suggested action comprises a suggested increase or decrease in the relative allocations of user interactions corresponding to the first freelancer data category.

6. The computer-implemented method of claim 1, wherein the plurality of freelancer data categories comprises one or more of finance, tax, insurance, legal, clients, leads, employees, teams, or projects.

7. The computer-implemented method of claim 1, wherein the freelancer account summary interface further comprises a second predicted result based on the suggested action associated with the first freelancer data category, the second predicted result associated with a second freelancer data category of the plurality of freelancer data categories.

8. A system comprising:
at least one processor; and
a non-transitory computer readable medium comprising instructions that, when executed by the at least one processor, cause the system to:
provide, for display on a client device associated with a freelancer account of a data integration system, selectable options identifying respective third-party services available for integration with the freelancer account, the respective third-party services comprising online financial accounts, email accounts, and calendar services;
integrate a plurality of third-party services with the freelancer account in response to receiving one or more respective user interactions with the selectable options provided on the client device, the plurality of third-party services comprising two or more of: an online financial account, an email account, an online calendar, or a local calendar of the client device;
identify user interactions with the freelancer account via the client device over a period of time;
determine interaction parameters based on the user interactions;
determine, for the freelancer account and the plurality of third-party services integrated with the freelancer account, freelancer information associated with a plurality of freelancer data categories;
analyze the interaction parameters and the freelancer information utilizing a machine learning model to generate a suggested action for freelancer activities related to the freelancer account, the suggested action associated with a first freelancer data category from the plurality of freelancer data categories; and
provide, for display on the client device associated with the freelancer account, a freelancer account summary interface comprising a notification of the suggested action together with a graphical representation of a predicted result over time associated with the first freelancer data category and responsive to the suggested action.

9. The system of claim 8, further comprising instructions that, wherein the machine learning model is trained with historical data associated with freelancer accounts other than the freelancer account.

10. The system of claim 8, wherein the user interactions associated with the freelancer account comprise relative allocations of user interactions corresponding to the plurality of freelancer data categories.

11. The system of claim 10, wherein the suggested action comprises a suggested increase or decrease in the relative allocations of user interactions corresponding to the first freelancer data category.

12. The system of claim 8, wherein the suggested action is further associated with a second freelancer data category of the plurality of freelancer data categories.

13. The system of claim 12, wherein the freelancer account summary interface further comprises a second predicted result based on the suggested action, the second predicted result associated with the second freelancer data category.

14. The system of claim 8, wherein the plurality of freelancer data categories comprises one or more of finance, tax, insurance, legal, clients, leads, employees, teams, or projects.

15. A non-transitory computer readable medium comprising instructions that, when executed by at least one processor, cause the at least one processor to:
provide, for display on a client device associated with a freelancer account of a data integration system, selectable options identifying respective third-party services available for integration with the freelancer account, the respective third-party services comprising online financial accounts, email accounts, and calendar services;
integrate a plurality of third-party services with the freelancer account in response to receiving one or more respective user interactions with the selectable options provided on the client device, the plurality of third-party services comprising two or more of: an online financial account, an email account, an online calendar, or a local calendar of the client device;
determine interaction parameters, the interaction parameters based on user interactions with the freelancer account over a period of time;
determine, for the freelancer account and the plurality of third-party services integrated with the freelancer account, freelancer information associated with a plurality of freelancer data categories;
analyze the interaction parameters and the freelancer information to generate a suggested action for freelancer activities related to the freelancer account, the suggested action associated with one or more freelancer data categories from the plurality of freelancer data categories; and
provide, for display on the client device associated with the freelancer account, a freelancer account summary interface comprising a notification of the suggested action together with graphical representation of a predicted result over time associated with at least one of the one or more freelancer data categories and responsive to the suggested action.

16. The non-transitory computer readable medium of claim 15, further comprising instructions that, when executed by the at least one processor, cause the at least one processor to:
identify an activated trigger corresponding to a particular user interaction with the freelancer account; and
generate the suggested action for the freelancer account based at least in part on identifying the activated trigger.

17. The non-transitory computer readable medium of claim 16, wherein the suggested action comprises enabling automation of an event related to the particular user interaction.

18. The non-transitory computer readable medium of claim 15, further comprising instructions that, when executed by the at least one processor, cause the at least one processor to utilize a trained machine learning model to generate the suggested action based on the interaction parameters and the freelancer information.

19. The non-transitory computer readable medium of claim 15, wherein the interaction parameters are further based on historical user interactions associated with free-lancer accounts other than the freelancer account.

20. The non-transitory computer readable medium of claim 15, wherein the suggested action comprises a sug-gested increase or decrease in relative allocations of user interactions with the freelancer account.

* * * * *